(12) United States Patent
Huang et al.

(10) Patent No.: US 8,246,208 B2
(45) Date of Patent: Aug. 21, 2012

(54) ELECTRONIC BOOK

(75) Inventors: Bao-Jun Huang, Shenzhen (CN); Jing Wen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 187 days.

(21) Appl. No.: 12/778,069

(22) Filed: May 11, 2010

(65) Prior Publication Data

US 2011/0134643 A1    Jun. 9, 2011

(30) Foreign Application Priority Data

Dec. 3, 2009    (CN) .......................... 2009 1 0310795

(51) Int. Cl.
*F21V 19/04*     (2006.01)
*F21V 13/00*     (2006.01)
*F21V 1/06*      (2006.01)
*F21V 11/00*     (2006.01)
*F21V 17/06*     (2006.01)
*A47B 19/00*     (2006.01)
*A61G 13/00*     (2006.01)

(52) U.S. Cl. ............ 362/253; 362/33; 362/98; 362/352; 362/433

(58) Field of Classification Search .................. 362/89, 362/90, 91, 98, 99, 102, 154, 155, 156, 249.1, 362/253, 288, 352, 433, 458, 33
See application file for complete search history.

(56) References Cited

U.S. PATENT DOCUMENTS

| | | | | |
|---|---|---|---|---|
| 4,494,177 A * | 1/1985 | Matthews | ................. | 362/402 |
| 4,700,634 A * | 10/1987 | Mills et al. | ................. | 108/43 |
| 4,989,123 A * | 1/1991 | Best | ................. | 362/102 |
| 6,533,431 B2 * | 3/2003 | Leifer et al. | ................. | 362/109 |
| 7,686,466 B2 * | 3/2010 | Lev et al. | ................. | 362/23 |
| 7,794,113 B2 * | 9/2010 | Lee | ................. | 362/274 |
| 2007/0103918 A1 * | 5/2007 | Lin | ................. | 362/427 |

* cited by examiner

Primary Examiner — David Crowe
(74) Attorney, Agent, or Firm — Altis Law Group, Inc.

(57) ABSTRACT

An electronic book includes a shell and an illumination device. The shell defines a housing. The illumination device is received in the housing, and includes a support arm rotatably connected to the shell, at least one light source fixed on the support arm, a opening mechanism movably connected to the support arm and opens or folds the support arm, and a light cover mounted on the opening mechanism. The light cover follows the opening mechanism to unfold or fold.

18 Claims, 9 Drawing Sheets

ELECTRONIC BOOK

BACKGROUND

1. Technical Field

The present disclosure relates to electronic reading devices, especially to an electronic book with an illumination device.

2. Description of Related Art

In recent years, electronic books are becoming more and more popular. Electronic books usually adopt an e-paper screen to show information. The e-paper screen shows information by reflecting ambient light, thereby the information shown by the e-paper screen is imperceptible in the darkness. Thus, users cannot use the electronic book in low light surroundings or in darkness.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
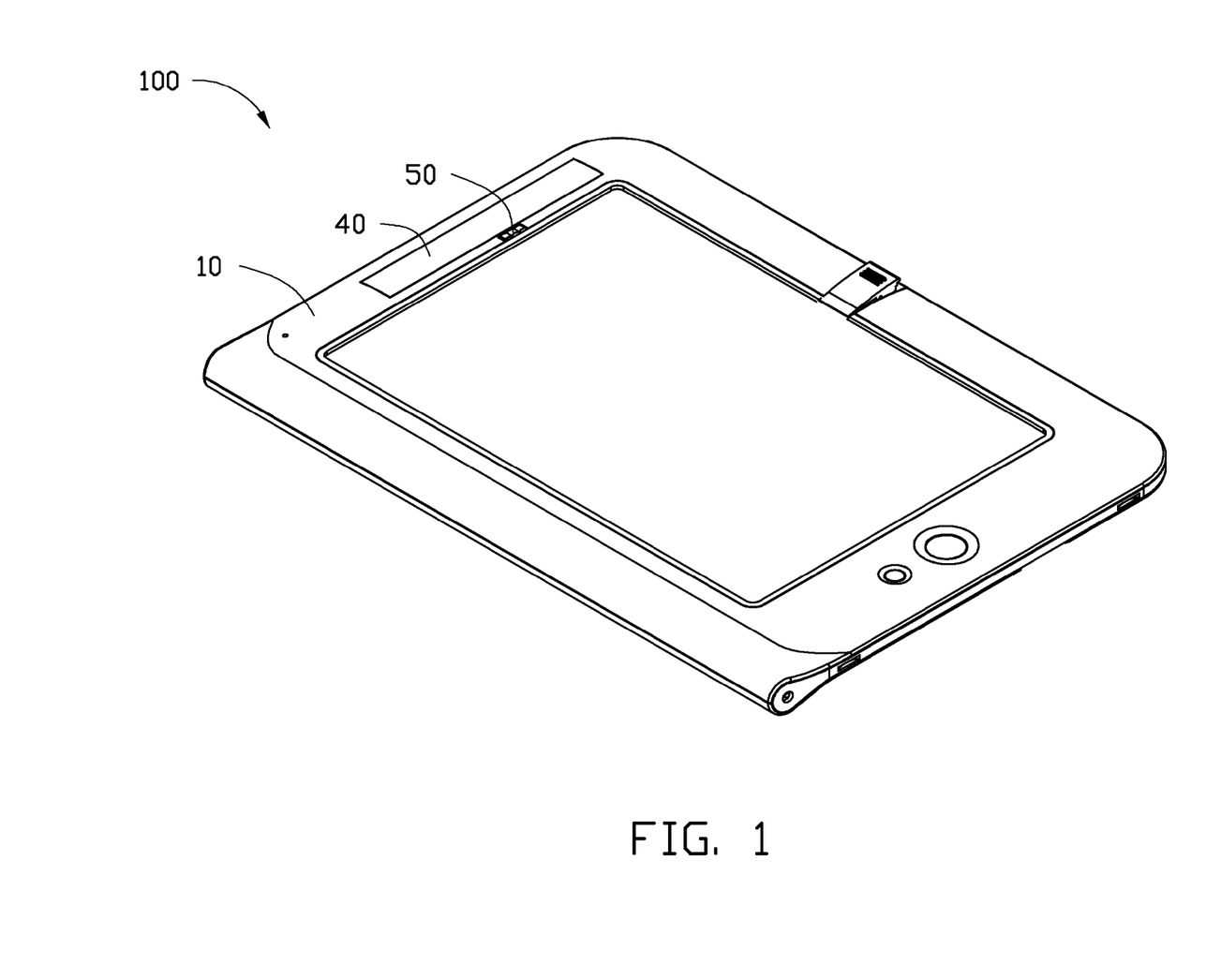
FIG. 1 is an isometric view of an electronic book, with an illumination device received therein, according to an exemplary embodiment.
Figure 2:
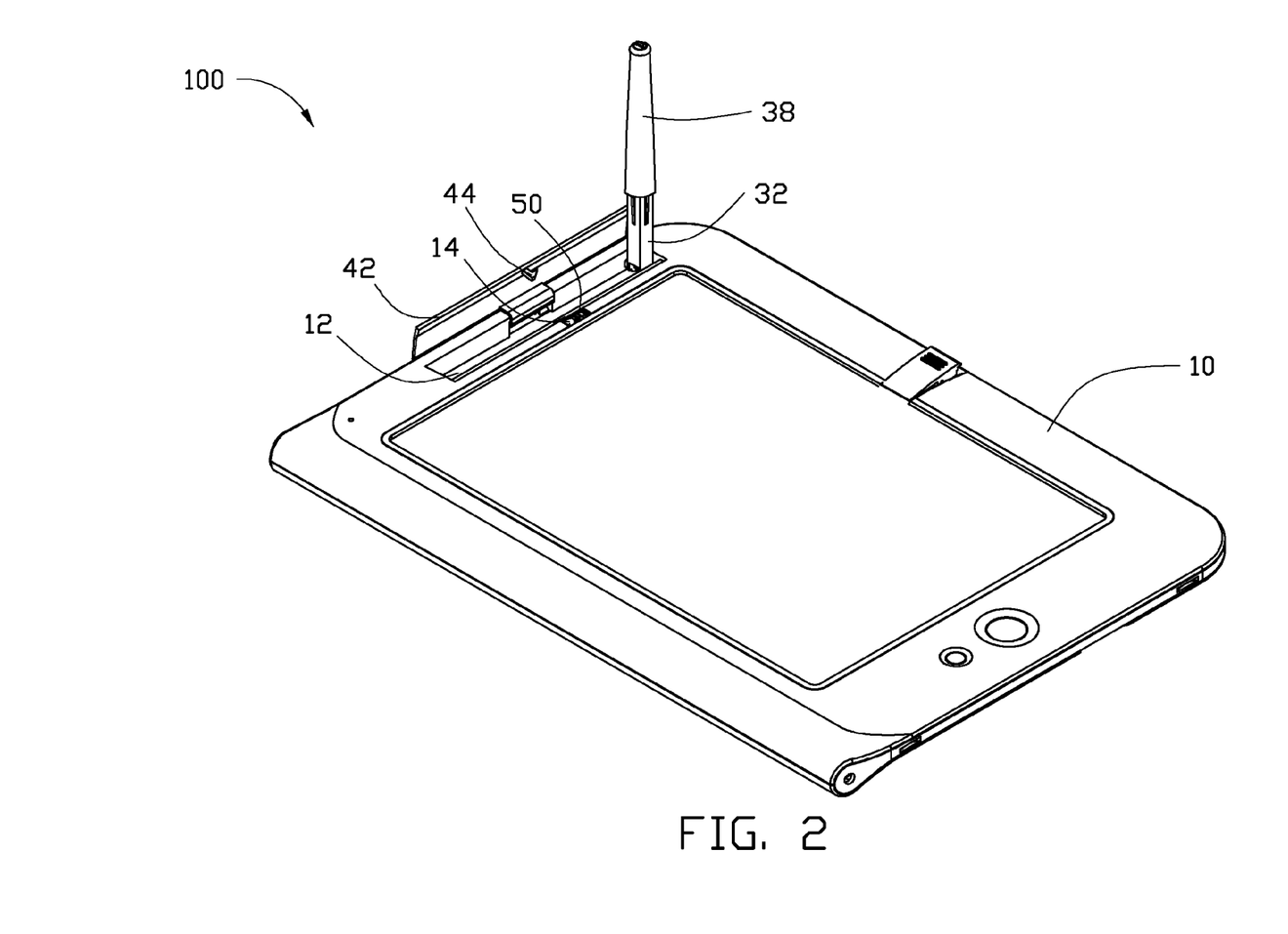
FIG. 2 is an isometric view of the electronic book in FIG. 1, with the illumination device exposed.
Figure 3:
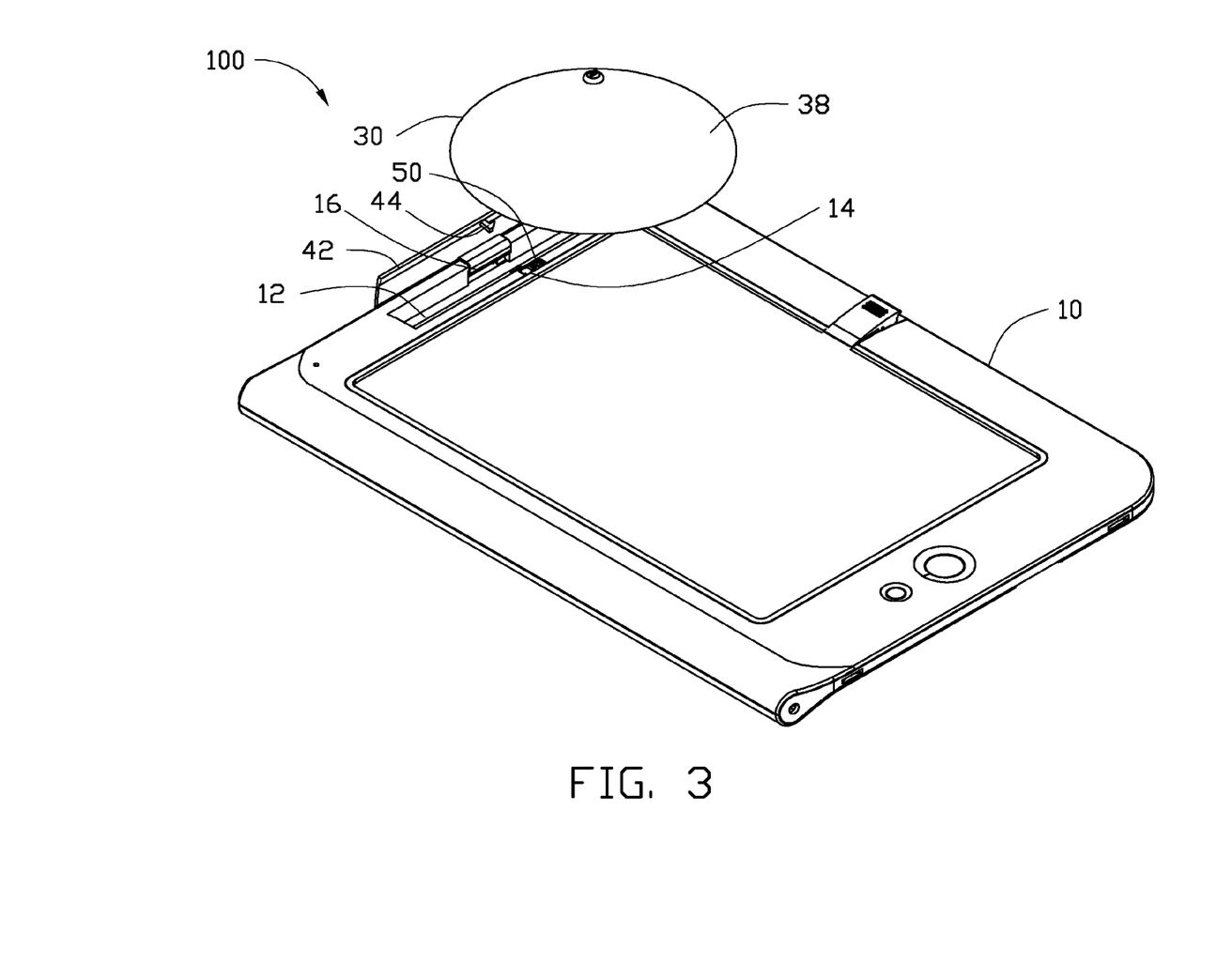
FIG. 3 is an isometric view of the electronic book in FIG. 1, with the illumination device in use.

Referring to FIGS. 1, 2 and 3, an electronic book 100 according to an exemplary embodiment, is shown, including a shell 10 and an illumination device 30. The shell 10 defines a housing 12. The illumination device 30 can be received in the housing 12. The illumination device 30 includes a support arm 32, with at least one light source 34 mounted on the support arm 32 (referring to FIG. 6), and a light cover 38. The support arm 32 rotatably fastens to the shell 10. The light cover 38 is made of ductile material and is able to unfold from or fold to the support arm 32. The electronic device 100 further includes a door 40 and a lock member 50. The door 40 is fastened to an edge of the housing 12. The lock member 50 is configured for locking or unlocking the door 40. Referring to FIG. 1, when the illuminating device 30 is not in use, the illuminating device 30 can be received in the housing 12, the door 40 closes the housing 12, and the lock member 50 locks the door 40, thus keeping the illuminating device 30 in the housing 12. Referring to FIGS. 2 and 3, when there is a need for the illuminating device 30, the lock member 50 is operated to unlock the door 40.

Figure 4:
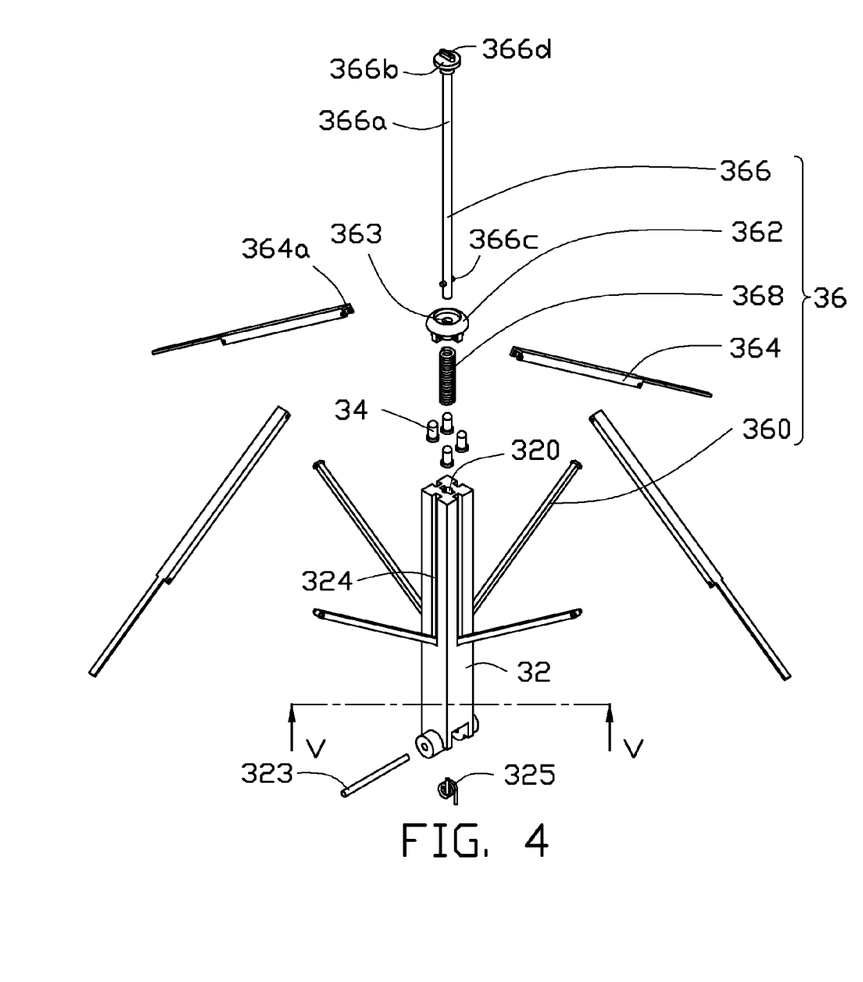
FIG. 4 is an exploded, isometric view of the illumination device in FIG. 3.
Figure 5:
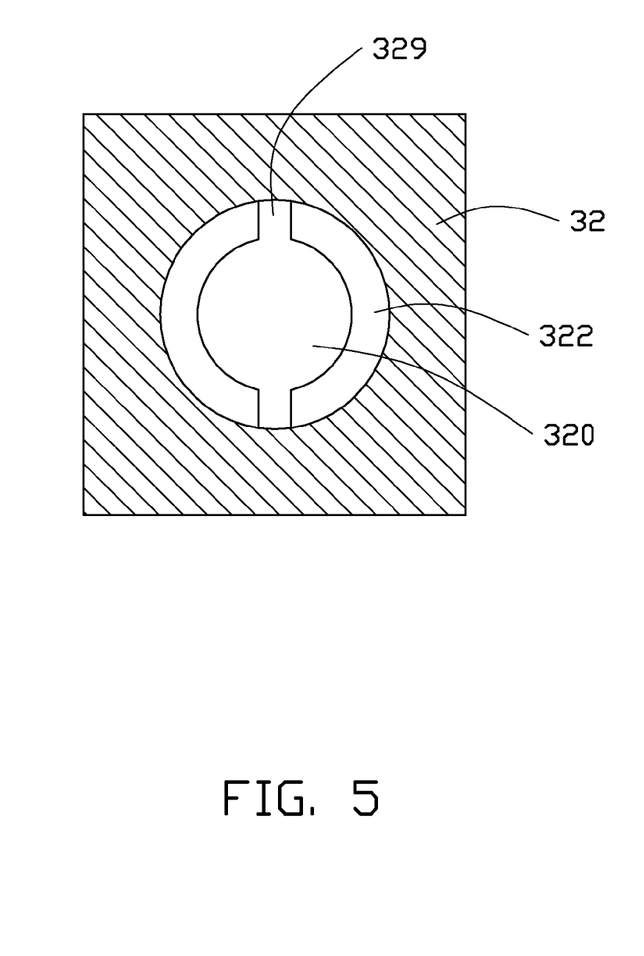
FIG. 5 is a cross-sectional view taken along line V-V in FIG. 4.
Figure 6:
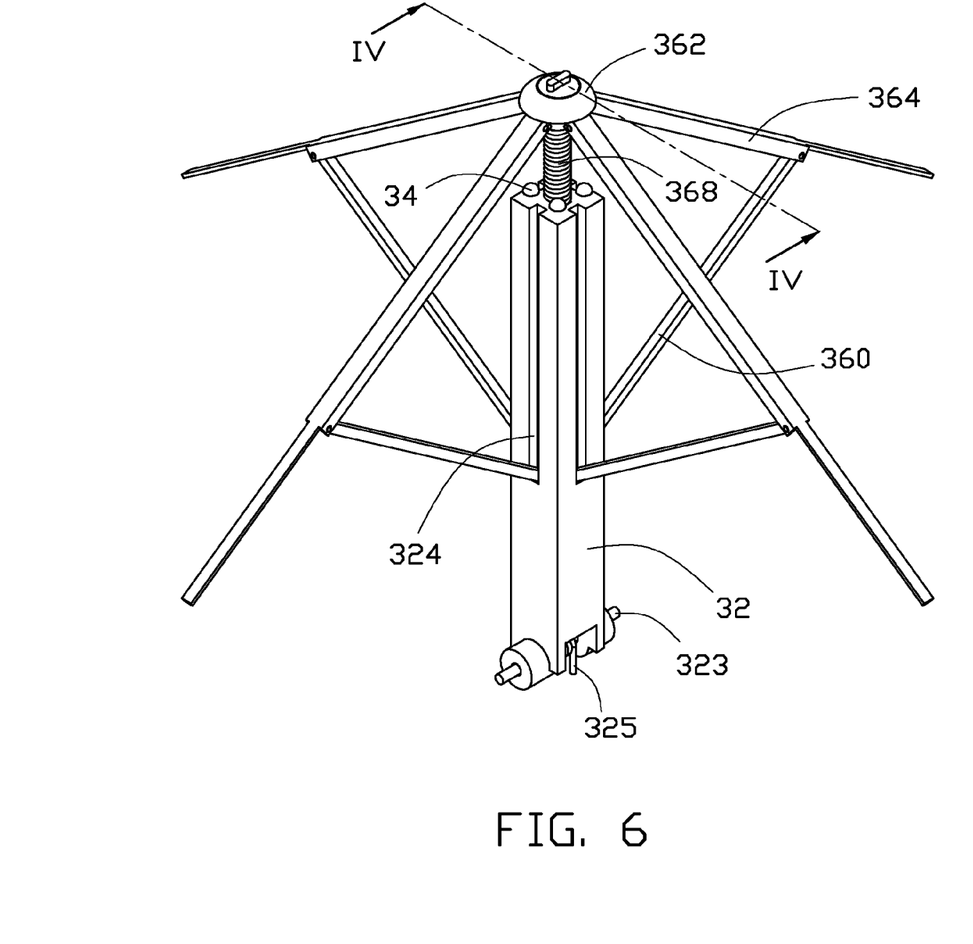
FIG. 6 is an isometric view of the illumination device of FIG. 3, with a lampshade removed.

In FIGS. 4-6, a detailed structure of the illuminating device 30 is disclosed. Referring to FIG. 4, the support arm 32 defines receiving grooves 324 axially aligned on the outer lateral surfaces, and a guiding groove 320 axially defined in the center thereof at one end of the support arm 32. Referring to FIG. 5, the support arm 32 further defines a restricting groove 322 axially defined therein at the other end. The restricting groove 322 and the guiding groove 320 communicate with each other and are cylindrical shaped. The diameter of the guiding groove 320 is smaller than that of the restricting groove 322, thus, a side step 327 (referring to FIG. 7) is formed at the boundary between the guiding groove 320 and the restricting groove 322. The restricting groove 322 is adjacent to a first shaft 323. Two sliding grooves 329 are defined in the opposite inner side walls of the guiding groove 320. The sliding grooves 329 communicate with the restricting groove 322.

Referring to FIGS. 4 and 6, the illumination device 30 further includes an opening mechanism 36, the first shaft 323 and a torsion spring 325. The first shaft 323 extends through the support arm 32 at the end defining the restricting groove 322 and plugs into the shell 10. The torsion spring 325 is fitted over the shaft 323 for providing elastic force to drive the support arm 32 out of the housing 12 automatically when the door 40 is opened. The light sources 34 are fixed on top of the support arm 32 and electronically connect to the electronic book 100. The illumination device 30 further includes a control switch (not labeled) for turning on and off the light sources 34.

The opening mechanism 36 includes a guiding member 366, a first elastic member 368, a supporting cap 362, holders 360, and stretching racks 364.

Figure 7:
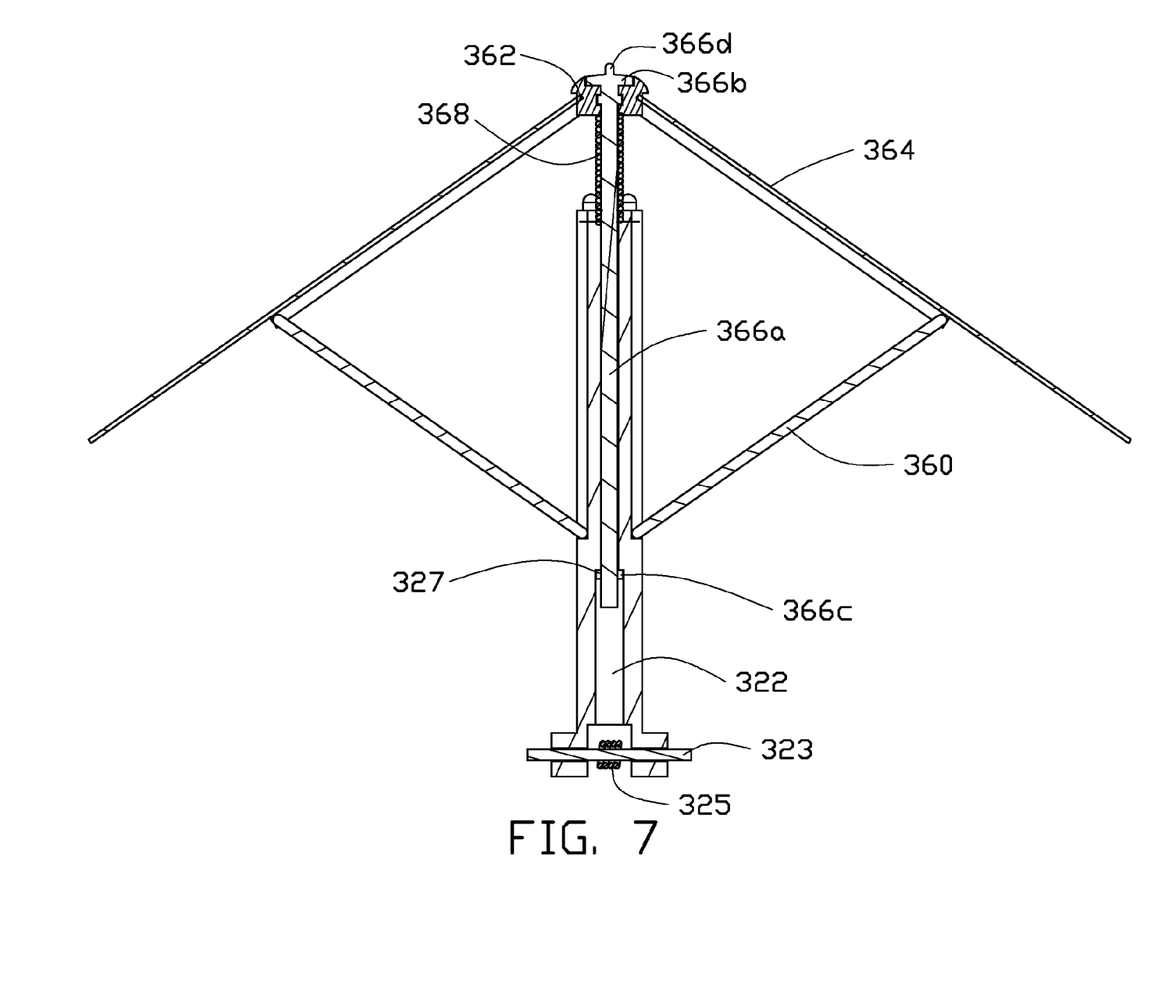
FIG. 7 is a cross-sectional view taken along line IV-IV of FIG. 6.

The guiding member 366 includes a long cylindrical guiding shaft 366a and a fixing portion 366b fixed on one end of the guiding shaft 366a. A driving portion 366d protrudes from the fixing portion 366b. A restricting portion 366c protrudes perpendicularly from the other end of the guiding shaft 366a. The restricting portion 366c and the guiding shaft 366a form a cross shape. Referring to FIG. 7, the width of restricting portion 366c is bigger than the diameter of the guiding groove 320 and is smaller than the diameter of the restricting groove 322. The restricting portion 366c is disposed in the restricting groove 322 and is blocked by the side step 327, to prevent the guiding member 366 from moving upward. The supporting cap 362 defines a first through hole 363. The fixing portion 366b is received in the first through hole 363.

The first elastic member 368 is fitted over the guiding shaft 366a and is disposed between the support arm 32 and the supporting cap 362. In this embodiment, the first elastic member 368 is a spring.

The stretching rack 364 defines a long accepting groove 364a. The supporting cap 362 and one end of the holder 360 are inserted respectively at each of the two ends of the accepting groove 364a. The stretching rack 364 is rotatably connected to the supporting cap 362. The other end of the holder 360 is rotatably fixed in the receiving grooves 324. The shape of the holder 360 matches with that of the receiving groove 324.

The light cover 38 blankets on the stretching rack 364 and follows the stretching rack 364 as it opens or folds.

Figure 8:
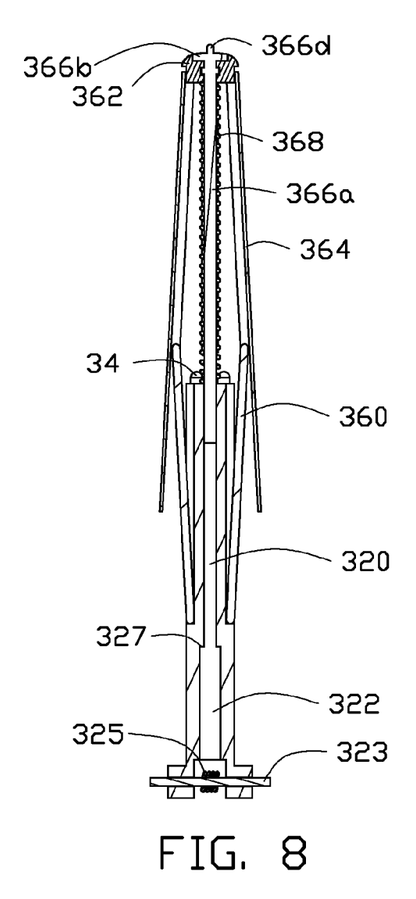
FIG. 8 is a cross-sectional view of the illumination device of FIG. 7 in a folded state.

Referring to FIGS. 7 and 8, when folding the light cover 38, first, rotate the driving portion 366d, then the guiding member 366 rotates in the support arm 32 till the restricting portion 366c faces the sliding groove 329. The first elastic member 368 drives the restricting portion 366c to slide into the sliding groove 329, and the guiding shaft 366a moves upward along the guiding groove 320 correspondingly. Then the holder 360 and the stretching rack 364 fold to the support arm 32, and the light cover 38 follows the stretching rack 364 to fold to the support arm 32 correspondingly.

When opening the light cover 38, first, press the fixing portion 366b, the guiding member 336 then moves downwards, correspondingly the stretching racks 364 and the holders 360 open and the light cover 38 follows the stretching rack 364 as it opens. When the restricting portion 366c reaches the restricting groove 322, user rotates the driven portion 366d till the side step 327 locks the restricting portion 366c, thus keeping the light cover 38 open.

Figure 9:
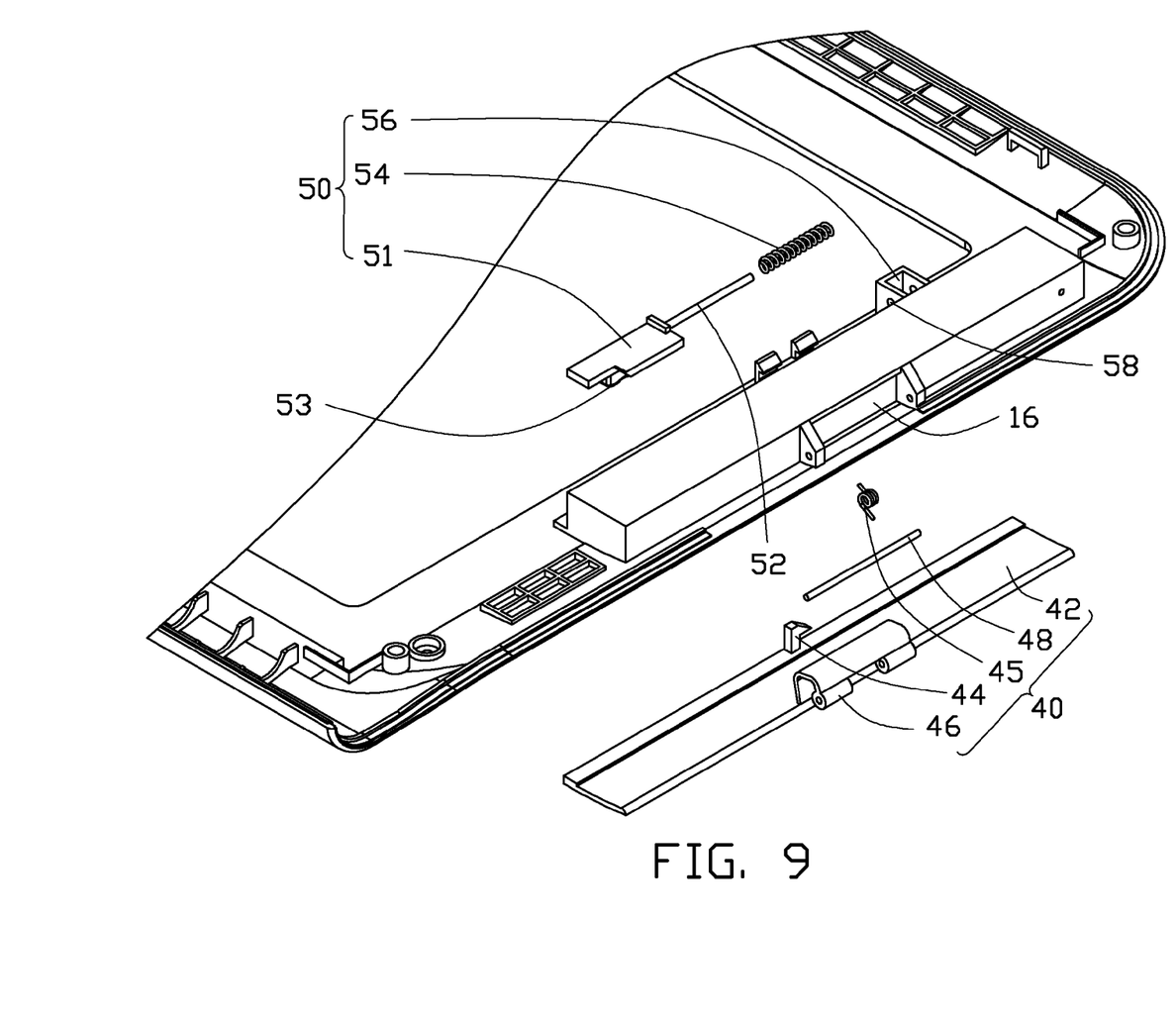
FIG. 9 is a partially exploded view of the electronic book of FIG. 2, viewed from a bottom aspect.

Referring to FIGS. 3 and 9, the shell 10 further defines an installing hole 14 and a slot 16 in a sidewall of the housing 12. The door 40 includes a cover 42, a hook 44, a hinge 46, a second shaft 48, and a second elastic member 45. The hook 44 and the hinge 46 respectively extend from two opposite edges of the cover 42. The hinge 46 is received in the slot 16. In assembling, the shaft 48 extends through the hinge 46 and mounts to the shell 10, thus, rotatably fixes the door 40 to the shell 10. The hook 44 detachably clasps the lock member 50. The second elastic member 45 is fitted over the second shaft 48 for providing elastic force to open the door 40 when the door 40 is unclasped. In this embodiment, the second elastic member 45 is a torsion spring. The cover 42 is configured for covering the housing 12 when the door 40 is closed.

The lock member 50 is exposed through and slidable in the installing hole 14, includes a main body 51, a spring 54, and a resisting portion 56. The main body 51 is configured for clasping the hook 44 of the door 40. The detail of the clasping structure is omitted, as it is familiar to a person skilled in the art. A third shaft 52 is protruded from one end of the main body 51. The spring 54 is fitted over the third shaft 52. The resisting portion 56 is fixed on the shell 10 and defines a second through hole 58 for receiving and holding the third shaft 52. A bolt block 53 protrudes from the main body 51. The length of the bolt block 53 is smaller than that of the installing hole 14. The bolt block 53 extends out of the shell 10 through the installing hole 14. The bolt block 53 can slide in the installing hole 14 to drive the main body 51 to slide correspondingly.

Referring to FIGS. 1, and 9, when the illumination device 30 is not in use, the illumination device 30 is received in the housing 12, the hook 44 of the door 40 buckles with the main body 51 of the locking member 50, the spring 54 pushes the main body 51 to confirm the clasp connection. By closing the door 40, the illumination device 30 is received in the housing 12.

Referring to FIGS. 2, and 9, when using the illumination device 30, the locking member 50 is moved to make the hook 44 unclasp from the main body 51, the door 40 is opened under the force of the elastic member 45 and the torsion spring 325 drives the illumination device 30 out of the housing 12. Then the fixing portion 366b of the illumination device 30 is pressed to open the light cover 38 for use.

Because of the illumination device 30, user can read the electronic book 100 when the ambient light is too low or in darkness. Furthermore, the illumination device 30 is received in the housing 12 and is covered by the door 40 when not in use, thus not affecting the appearance of the electronic book 100.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An electronic book comprising:
a shell defining a housing;
an illumination device received in the housing, comprising a support arm rotatably connected to the shell, at least one light source fixed on the support arm, an opening mechanism connected to the support arm and being able to unfold from and fold to the support arm, and a light cover mounted on the opening mechanism and following the opening mechanism to unfold and fold;
wherein the support arm defines a guiding groove axially defined in the center thereof, and receiving grooves axially aligned on the outer lateral surfaces, the opening mechanism comprises a guiding member, a supporting cap, an elastic member, holders, and stretching racks, wherein the guiding member is rotatably disposed in the axial guiding groove, the supporting cap is fixed on the guiding member, the elastic member is fitted over the guiding member beneath the supporting cap, each of the stretching racks rotatably connects with the supporting cap and one end of each of the holders, the other ends of the holders are rotatably fixed in the receiving grooves, and the light cover is mounted on the stretching racks.

2. The electronic book of claim 1, wherein the support arm defines a restricting groove axially therein, the restricting groove communicates with the guiding groove, the guiding member comprises a guiding shaft and a restricting portion perpendicularly protrudes from one end of the guiding shaft, the width of the restricting portion is bigger than the diameter of the axial guiding groove and is smaller than the diameter of the restricting groove, the guiding groove defines two opposite sliding grooves communicated with the restricting groove, when the restricting portion aligns with the sliding grooves, the elastic member drives the restricting portion to slide into the sliding grooves.

3. The electronic book of claim 1, wherein the stretching racks define elongated accepting grooves, the supporting cap and the holders are respectively fixed at two ends of the accepting grooves.

4. The electronic book of claim 1, further comprising a shaft rotatably connecting the support arm to the shell, and a torsion spring fitted over the shaft.

5. The electronic book of claim 1, further comprising a door for covering the housing and a lock member for locking the door to the shell.

6. The electronic book of claim 5, wherein the shell defines an installing hole, the lock member is exposed through and slidable in the installing hole.

7. The electronic book of claim 6, wherein the lock member comprises a main body configured for clasping the door and a bolt block protruded from the main body, the bolt block extends out of the shell through the installing hole and the length of the bolt block is smaller than that of the installing hole, when the bolt block is moved, the main body to slide correspondingly.

8. The electronic book of claim 7, wherein a shaft protrudes from one end of the main body, a spring fitted over the shaft, and a resisting portion fixed on the shell, wherein the resisting portion receives and holds the shaft.

9. The electronic book of claim 5, wherein the shell defines a slot communicating with the housing, the door comprises a hook for clasping the lock member, a hinge received in the slot, a shaft, and an elastic member, wherein the shaft extends through the hinge and is mounted to the shell to rotatablely fix the door to the shell, the elastic member is fitted over the shaft for providing elastic force to open the door.

10. An electronic book comprising:
a shell defining a housing;
an illumination device, comprising a support arm installed in the housing, at least one light source electronically connected to the electronic book, an opening mechanism connected to the support arm, and a light cover blanketed on the opening mechanism, wherein the light cover and the opening mechanism is able to synchronously unfold from and fold to the support arm, the illumination device is able to be received in the housing when the opening mechanism fold to the support arm;
wherein the support arm defines a guiding groove axially defined in the center thereof, and a restricting groove axially therein, the opening mechanism comprises a guiding member, a supporting cap, holders, and stretching racks, wherein the supporting cap is fitted over the guiding member, each of the stretching racks rotatably connects to the supporting cap and one end of each of the holders, the other ends of the holders are rotatably connected to the support arm, the light cover is blanketed on the stretching racks, the restricting groove communicates with the guiding groove, the guiding member is able to lock in the restricting groove, when the guiding member is unlocked, the guiding member moves upward and the opening mechanism folds to the support arm.

11. The electronic book of claim 10, wherein the guiding member comprises a guiding shaft and a restricting portion perpendicularly protrudes from one end of the guiding shaft, the width of the restricting portion is bigger than the diameter of the guiding groove and is smaller than the diameter of the restricting groove, the restricting portion locks the guiding member in the restricting groove, the guiding groove defines two opposite sliding grooves communicating with the restricting groove, when the guiding member unlocked, the restricting portion slides upward into the sliding groove.

12. The electronic book of claim 10, wherein the opening mechanism further comprises an elastic member, the elastic member is fitted over the guiding member beneath the supporting cap.

13. The electronic book of claim 10, wherein the support arm defines receiving grooves axially aligned on the outer lateral surfaces, one end of the holders is rotatably fixed in the receiving grooves, the other end of the holders connect with the stretching racks rotatably, the shape of the holder matches with that of the receiving groove.

14. The electronic book of claim 10, wherein the stretching racks define elongated accepting grooves, the supporting cap and one end of each of the holders are respectively fixed at two end of each of the accepting grooves.

15. The electronic book of claim 10, further comprising a door for covering the housing and a lock member for locking the door to the shell.

16. The electronic book of claim 15, wherein the shell defines an installing hole, the lock member is exposed through and slidable in the installing hole.

17. The electronic book of claim 16, wherein the lock member comprises a main body configured for clasping the door and a bolt block protruding from the main body, the bolt block extends out of the shell through the installing hole and the length of the bolt block is smaller than that of the installing hole, when the bolt block is moved, the main body slides correspondingly.

18. The electronic book of claim 17, wherein a shaft protrudes from one end of the main body, a spring fitted over the shaft, and a resisting portion fixed on the shell, wherein the resisting portion receives and holds the shaft.

* * * * *